(12) United States Patent
Won et al.

(10) Patent No.: US 7,016,682 B2
(45) Date of Patent: Mar. 21, 2006

(54) HYBRID WIRELESS ACCESS BRIDGE AND MOBILE ACCESS ROUTER SYSTEM AND METHOD

(75) Inventors: Chan Yeon Won, San Jose, CA (US); Seong Young Park, Santa Clara, CA (US); Ki B. Kang, Santa Clara, CA (US)

(73) Assignee: Air Broadband Communications, Inc., Santa Clara, CA (US)

( * ) Notice: Subject to any disclaimer, the term of this patent is extended or adjusted under 35 U.S.C. 154(b) by 343 days.

(21) Appl. No.: 10/377,949

(22) Filed: Feb. 27, 2003

(65) Prior Publication Data

US 2004/0203740 A1    Oct. 14, 2004

Related U.S. Application Data

(60) Provisional application No. 60/361,872, filed on Mar. 4, 2002.

(51) Int. Cl.
*H04Q 7/20* (2006.01)
(52) U.S. Cl. .................... 455/445; 709/245; 370/338
(58) Field of Classification Search ............... 370/338, 370/349; 455/445, 426.1, 433, 426; 709/245
See application file for complete search history.

(56) References Cited

U.S. PATENT DOCUMENTS

| | | | |
|---|---|---|---|
| 5,384,777 A | 1/1995 | Ahmadi et al. ............ 370/85.2 |
| 5,499,243 A | 3/1996 | Hall ........................... 370/85.8 |
| 5,677,909 A | 10/1997 | Heide ......................... 370/347 |
| 5,706,439 A | 1/1998 | Parker .................... 395/200.17 |
| 5,940,372 A | 8/1999 | Bertin et al. ................. 370/238 |
| 5,970,062 A | 10/1999 | Bauchot ..................... 370/345 |
| 6,160,804 A | 12/2000 | Ahmed et al. ............... 370/349 |
| 6,195,705 B1 * | 2/2001 | Leung ......................... 709/245 |
| 6,240,083 B1 | 5/2001 | Wright et al. ............... 370/348 |
| 6,256,300 B1 | 7/2001 | Ahmed et al. ............... 370/331 |
| 6,366,761 B1 | 4/2002 | Montpetit .................. 455/12.1 |
| 6,381,228 B1 | 4/2002 | Prieto, Jr. et al. ........... 370/323 |
| 6,466,964 B1 | 10/2002 | Leung et al. ................ 709/202 |
| 6,473,413 B1 | 10/2002 | Chiou et al. ................ 370/331 |
| 6,484,211 B1 | 11/2002 | Turunen ..................... 709/245 |
| 2002/0191572 A1 * | 12/2002 | Weinstein et al. .......... 370/338 |
| 2003/0220111 A1 * | 11/2003 | Kang ......................... 455/445 |
| 2004/0022222 A1 * | 2/2004 | Clisham ..................... 370/338 |

* cited by examiner

*Primary Examiner*—William D. Cumming
(74) *Attorney, Agent, or Firm*—Haverstock & Owens LLP (57) ABSTRACT

The present invention provides systems and methods that allow mobile devices, such as PDAs, mobile telephones, and laptops to roam seamlessly between subnets of a mobile wireless network and communicate through the network with local mobile devices and/or Internet sites without having to acquire a new or temporary Internet Protocol (IP) address. The network enables a wireline IP router to support wireless mobile devices. The network performs real-time soft-roaming to enable instantaneous connectivity of a visiting mobile device. Specifically, the network relies on the subnets to share IP addresses of the mobile devices.

45 Claims, 5 Drawing Sheets

HYBRID WIRELESS ACCESS BRIDGE AND MOBILE ACCESS ROUTER SYSTEM AND METHOD

RELATED APPLICATION

This Patent Application claims priority under 35 U.S.C. 119 (e) of the co-pending U.S. Provisional Patent Application, Ser. No. 60/361,872, filed Mar. 4, 2002, and entitled "HYBRID WIRELESS ACCESS BRIDGE AND MOBILE ACCESS ROUTER". The U.S. Provisional Patent Application, Ser. No. 60/361,872, filed Mar. 4, 2002, and entitled "HYBRID WIRELESS ACCESS BRIDGE AND MOBILE ACCESS ROUTER" is also hereby incorporated by reference.

FIELD OF THE INVENTION

The present invention relates to network technology. More particularly, the present invention relates to maintaining connectivity while moving between subnets of a mobile wireless network without acquiring a new Internet Protocol (IP) address.

BACKGROUND OF THE INVENTION

IP routing depends on a well-structured hierarchy. Routers interconnect networks and send data from one network to another. Networks can interconnect with other networks and contain subnetworks. Private networks are commonly connected to the Internet through one or more routers (which may also be known as a gateway) so that devices on the private network can communicate with nodes on the Internet.

When a block of information or packet is sent from the Internet, routers will look only at the first few bits of an IP address and forward the packet to the current network delineated by a router. Each IP address has a four octet format. Typically, humans communicate IP addresses in a dotted decimal format, with each octet written as a decimal integer from other octets by decimal points. Routers further out look at the next few decimal integers, sending the packet to a subnet, which may be a local area network (LAN). The LAN router will look at the final decimal integer of the IP address and send the packet to a specific machine. Within a LAN, or a subnet, data is delivered using a physical MAC address assigned to each network interface card (NIC). This is a fixed address tied to an Ethernet card. The Address Resolution Protocol (ARP) maps the IP address to the MAC address. The router follows the APP and sends out a broadcast message asking for the device associated with the particular IP address to respond with its MAC address. Outside of the subnet, delivery based on the MAC address is not possible since there is no logical relationship to their number and the location on the network they reside. Data is routed to a next higher subnet. If the destination is there, the MAC address is resolved and the data is delivered. Therefore, outside of the subnet, the IP address is used for routing. Inside the subnet, the MAC address is used for delivery.

For a situation where there are mobile devices, such as PDAs, mobile telephones, and laptop computers, attached to an access point, the mobile devices' MAC address is associated with an IP address from within the subnet router's IP address space. If a user desires to take the mobile device that is attached to one access point and travel with it so that is attaches to a different access point within the same subnet, all that is necessary is for the new access point to respond to the MAC address of the mobile device that has just entered, and the previous access point to cease to respond to that MAC address.

If, however, the mobile device moves from one subnet to another, the mobile device cannot communicate over the new (remote) subnet. First, the mobile device is usually configured to send messages through a specified router at its original (home) subnet. Because it is no longer present at the home subnet and the specified router cannot be immediately located, communications from the mobile device will not be sent by the remote subnet. In addition, communications to the mobile device will be routed to the mobile device's home subnet. Because the router there will not know where to forward the packet, the communications will be lost. The result is that either the remote subnet must reconfigure its list of available IP addresses to accommodate the visiting mobile device, which is a burdensome and costly process, or the mobile device must acquire a new IP address each time it logs onto a new network or subnet. As such, the mobile device will be required to re-register with the LAN and may be required to re-enter a personal identification number (PIN) or some other password when connecting to a new subnet. Thus, seamless hand-offs can only be done within a subnet and not across different subnets.

Figure 1:
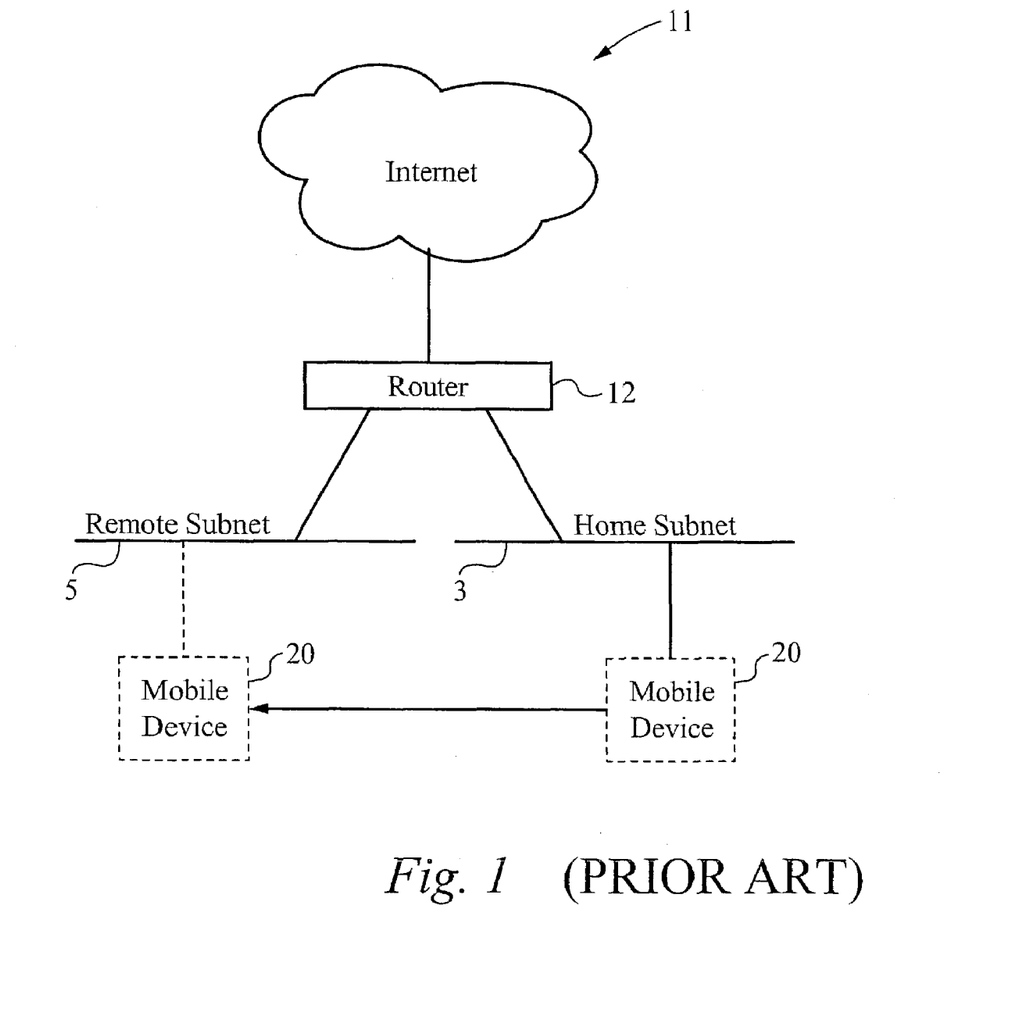
FIG. 1 is a prior art schematic diagram of a mobile IP network segment and a method whereby a mobile device normally based at a home subnet may connect with a remote subnet, using conventional procedures.

FIG. 1 illustrates the currently available approach to manage roaming between subnets for a mobile telephone or other mobile device. As illustrated, the Internet 11 allows mobile devices on a home subnet 3 to communicate with mobile devices on a remote subnet 5 through a conventional wired router 12. In this specific example, a mobile device 20 having an IP address is normally connected to home subnet 3. In other words, the subnet 3 is the home subnet for mobile device 20.

For a situation where mobile device 20 migrates from its home subnet 3 to the remote subnet 5, either the mobile device 20 or the subnet 5 must undergo some transformation. As mentioned before, either the mobile device 20 must acquire a new IP address or the remote subnet 5 must reset its list of available IP addresses to accommodate the mobile device 20.

What is needed is a system and method for maintaining a permanent IP address when roaming across different subnets of a wireless network without requiring the remote subnet to undergo some transformation.

SUMMARY OF THE INVENTION

The present invention provides systems and methods that allow mobile devices, such as PDAs, mobile telephones, and laptops to roam seamlessly between subnetworks (hereinafter, "subnets") of a mobile wireless network and communicate through the network with local mobile devices and/or Internet sites without having to acquire a new or temporary Internet Protocol (IP) address. The network enables a wireline IP router to support wireless mobile devices. The network performs real-time soft-roaming to enable instantaneous connectivity of a visiting mobile device. Specifically, the network relies on the subnets to share IP addresses of the mobile devices. When a mobile device connects to a subnet within the network, the subnet forwards information about the mobile device to neighboring subnets. Specifically, the subnet forwards the mobiles device's IP address, media access control (MAC) address, and current (inbound or outbound) location corresponding to an access point and subnet, including a master subnet. Note that the network can be capable of handling any mobile device regardless of its address or home network.

In one aspect of the present invention, a mobile wireless network is disclosed. The network can be characterized as including a plurality of subnets, with at least one subnet coupled to a network router. The network router can be any conventional wired router coupled to the Internet. Each subnet preferably includes at least one access point. Each neighboring subnet preferably shares user information to allow a mobile device to remain coupled to the wireless network regardless of which subnet the mobile device is located. In other words, the mobile device stays coupled with the same IP address while moving between the subnets.

The subnet can be referred to as mobile access router (MAR). The MARs manage roaming between the access points. The MARs include a plurality of subnet tables for tracking the mobile devices located in its access point(s) and in neighboring MAR(s). The subnet tables are preferably updated when the mobile devices move from one subnet to another. The subnet tables may include the mobile device's IP address, MAC address, and current location corresponding to a subnet and an access point.

The access point can be a radio antennae or the subnet receiver. The current location of the mobile device is characterized as either an inbound or outbound location. In other words, a mobile device moving from a first subnet to a second subnet will be identified as outbound in the subnet tables for the first subnet and inbound in the subnet tables for the second subnet.

Another aspect of the present invention provides a method of allowing a mobile device to remain coupled to a mobile wireless network. The mobile device preferably accesses the wireless network through an access point, with the access point being coupled to a subnet, The wireless network preferably comprises a plurality of subnets. Such method is characterized as including the following: (a) assigning each mobile device an IP address, MAC address, and current location corresponding to an access point and subnet, including a master subnet; (b) embedding the IP address and the MAC address as user information in a packet; (c) broadcasting the user information, including the IP address, MAC address, and current location, to neighboring subnets; (d) forwarding incoming packets to the mobile device's current location; and (e) assigning the MAC address as gateways for all mobile devices, wherein the mobile devices recognize the MAC address as gateways when a user moves from one subnet to another subnet.

Another aspect of the invention relates to a mobile wireless network that includes a plurality of subnets arranged in an array of subnets. Each of the subnets preferably has a plurality of neighboring subnets and a plurality of non-neighboring subnets. At least one subnet preferably couples to a network router, with each subnet preferably including at least one access point. Preferably, each neighboring subnet shares user information to allow a mobile device to remain coupled to the wireless network.

Another aspect of the invention relates to a mobile wireless network that includes a plurality of subnets coupled to a master subnet. The master subnet preferably couples to a network router. The network router can be any conventional wired router. Each subnet preferably includes at least one access point. Preferably, each neighboring subnet shares user information to allow a mobile device to remain coupled to the wireless network.

The master subnet includes a master subnet table (i.e., address binding records (ABR)) for tracking all mobile devices among the subnets. Preferably, the master subnet table is updated when the mobile devices move from one subnet to another. The master subnet table preferably includes IP addresses, MAC addresses, and current location information of all mobile devices among the subnets.

Another aspect of the invention relates to a mobile wireless network that includes a plurality of subnets. Preferably, at least one subnet couples to a network router and each subnet includes at least one access point. Preferably, each neighboring subnetwork shares user information to allow a mobile device to remain coupled to the wireless network at any location within the wireless network. The mobile device retains same IP address when roaming among the neighboring subnetworks.

DETAILED DESCRIPTION OF THE INVENTION

Figure 2:
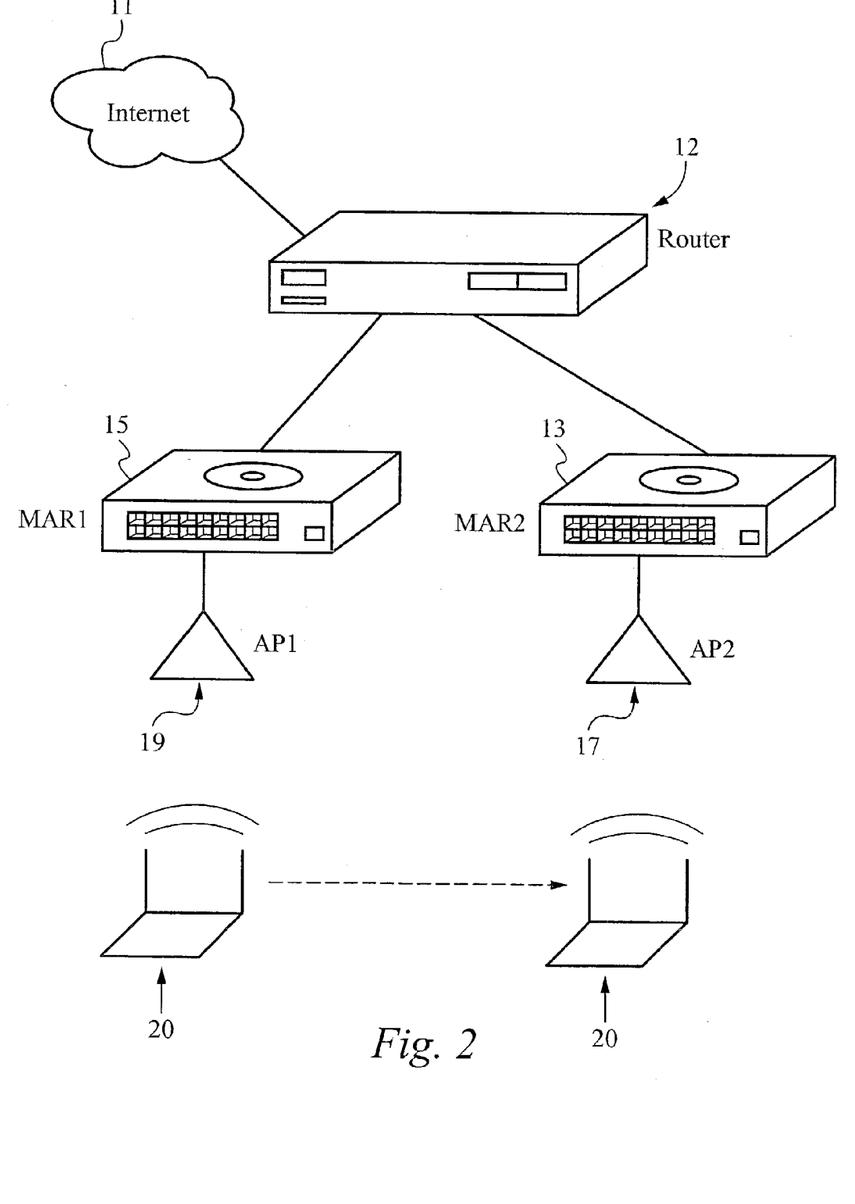
FIG. 2 is schematic diagram of a mobile IP network segment illustrating a home subnet and a remote subnet and a method whereby a mobile device normally based at a home subnet may connect with a remote subnet, using architecture of this invention.

FIG. 2 is a block diagram illustrating a system in which the present invention is implemented. The present invention is implemented in a mobile wireless network. Although the present invention is described as being implemented in a mobile wireless network, the present invention can also be implemented in a fixed wireless network. As shown, mobile device 20 (e.g. laptop computer or cellular phone) is initially based at home subnetwork (subnet) 15 and attached to access point 19. The subnets serve as routers linked to various access points within each subnet. The subnets also connect to an Internet router 12 via a communications connection. Internet router 12, in turn, connects to Internet destinations 11 through a communications connection. The subnets simultaneously support 802.11 b/g/a standards, as well as BLUETOOTH. It should be noted that there can be multiple subnets within the wireless network. In a wireless network, access points 19 and 17 can have radio antennas and receivers for receiving packets. The access points 19 and 17 also designate connection points in the wireless (or non-wireless) network. According to the present invention, each subnet can manage up to 16 access points to provide roaming and throughput controls. Each access point can handle up to 40 users. Therefore, each subnet connects up to 640 users. While the drawing of FIG. 2 shows only two access points, it will be appreciated that there can be many access points.

Assume that mobile device 20 wishes to communicate via the Internet 11 while visiting an access point 17 connected to remote subnet 13. To allow this the subnets 15 and 13 include intelligence tables, which share information between the subnets. The intelligence tables in each subnet include mobile device information, such as a mobile device's IP address, MAC address, and current location corresponding to the access point and subnet. The current location is either an inbound or outbound location. The subnets share this information with each neighboring subnet within the mobile network. Thus, the subnet 15 will share mobile device's 20 IP address, MAC address, and current location (which is initially inbound, of course), with the subnet 13 and other neighboring subnets. As mobile device 20 moves from the subnet 15 to the subnet 13, the subnet 15 will update its table to indicate an outbound location for the mobile device 20. The subnet 15 will simultaneously notify the subnet 13 (and any neighboring subnets) to update its intelligence tables to reflect the movement of the mobile device 20. Thus, the subnet 13 will have an entry for the mobile device 20 that will contain an inbound entry under its current location column, along with the mobile device's 20 IP address and MAC address. It should be noted that the mobile device 20 will maintain a permanent IP address, upon initial registration at the subnet 15, no matter where it then moves within the network. The mobile device 20 receives a new IP address when it logs 'off' and back 'on' or if it moves beyond the network. When that occurs, the subnet 15 will remove the mobile device's 20 information from its intelligence tables and notify the subnet 13 (and all neighboring subnets) to update its intelligence tables to reflect the disappearance of the mobile device 20. After the mobile device 20 logs off or exits the network, the IP address can be made available to other mobile devices desiring Internet access. An important goal of the present invention is to keep a mobile device's connection intact no matter where it moves within the network. By sharing information among neighboring subnets, the subnets allow mobile device's to roam between different subnets while maintaining a permanent IP address.

Referring to FIG. 2, assume that mobile device 20 prepares a message to a destination on Internet 11. The IP facilities of the mobile device 20 will divide the message into packets, each having a destination IP address specifying the Internet destination. Each packet will also include a source IP address configured for the mobile device 20. Note that, along with packet length and other control information, source and destination IP addresses reside at defined locations within a header of each packet.

Assume that the mobile device 20 is a visiting node having a home base at the subnet 15. Therefore, it is configured with an IP address appropriate for its home subnet but not for the remote subnet 13. Specifically, the Internet 11 will route packets addressed to the mobile device 20 to its home subnet 15, regardless of whether the mobile device 20 is connected to the subnet 13. To remedy this problem, intelligence tables in each neighboring subnet, which include the subnet 13, maintain and share IP addresses and MAC addresses of each mobile device.

When the subnet 15 receives packets from the Internet 11, it will instantaneously review its intelligence tables, realize that the mobile device 20 is outbound at a different subnet, and forward the packets to neighboring the subnet 13. The subnet 13 will realize that the mobile device 20 is connected to one of its access points. From there, the subnet 13 will send the packets to the mobile device 20 via the access point 17. Conversely, when the mobile device 20 sends messages from a remote subnet, the remote subnet will forward the packets to mobile device's source address, which will fall under its home subnet and, from there, to the Internet router 12. The Internet router 12 sends the packets to the Internet 11 where it is routed to its destination.

The subnets can also include private network addresses. At this time, the Internet router 12 supports NAT supplies NAT solutions for mapping between private IP addresses and public IP addresses.

Figure 3:
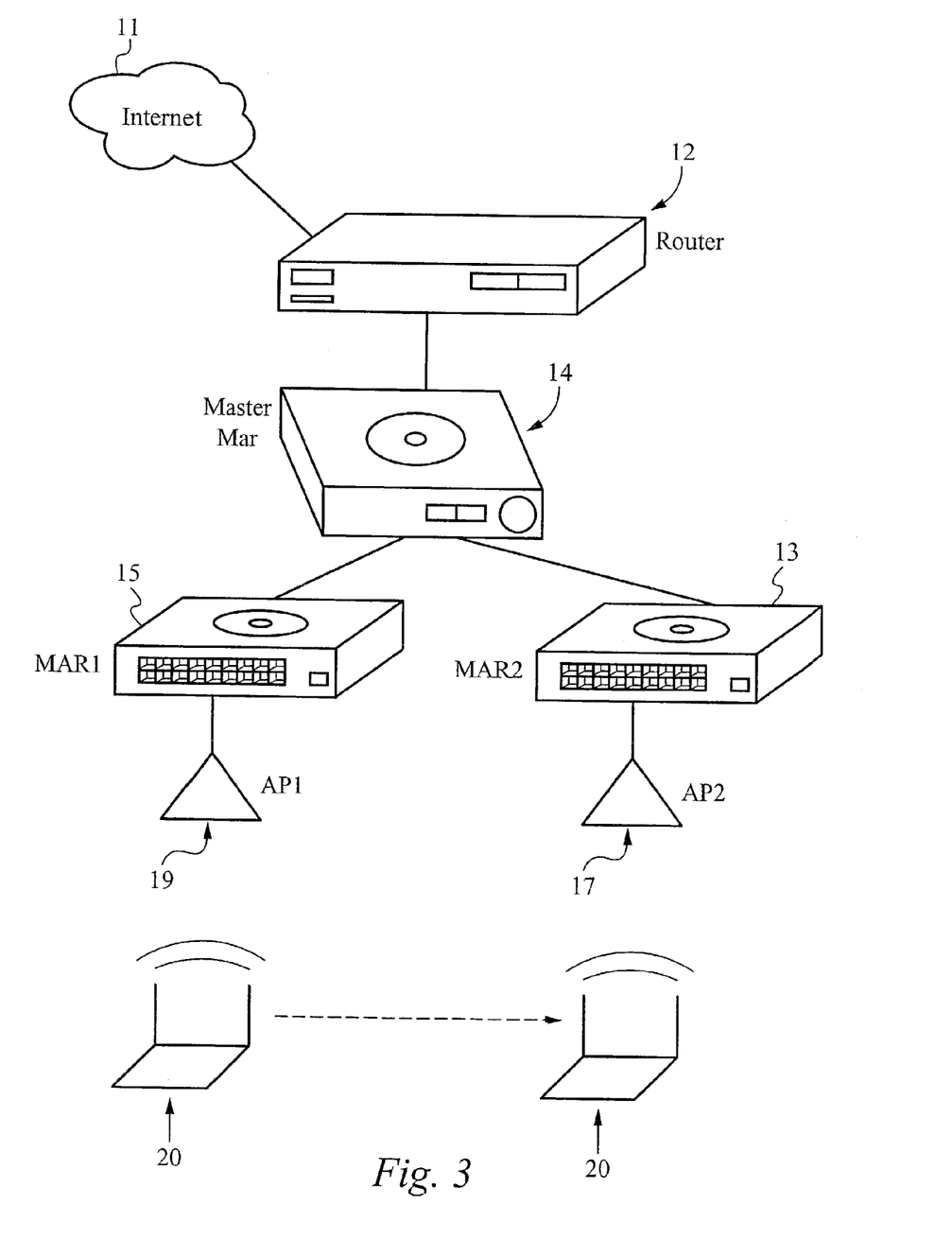
FIG. 3 is a schematic diagram of a mobile IP network segment illustrating a home subnet and a remote subnet in which both subnets are coupled to a master subnet and a method whereby a mobile device normally based at a home subnet may connect with a remote subnet, using architecture of this invention.

FIG. 3 is a schematic diagram illustrating a mechanism for implementing a mobile IP network according to one embodiment of the invention. In this figure, a master subnet 14 is coupled between the IP router 12 and the subnets 15 and 13. The master subnet 14 is also a router, managing roaming and higher-level management and security features. Each master subnet controls up to eight subnets and supports up to 5,120 concurrent mobile devices. Of particular importance, the master subnet includes intelligence tables, and these tables contain information about all mobile devices within each subnet of the network. Therefore, whenever a mobile device moves from one subnet to another, the subnets and the master subnet will each update their own intelligence tables. As in the case of the subnets, the master subnet intelligence tables will also include IP addresses, MAC addresses, and current location information corresponding to the access point and subnet, including master subnets. Unlike the subnets, however, the master subnet's intelligence tables will include tracking information of all the subnets. It should also be noted that the wireless network can include multiple master subnets coupled together to provide support for a virtually unlimited number of users. Each subnet is preferably coupled over fast Ethernet to a master subnet. The master subnet 14 can include private network addresses. The Internet Router 12 supplies NAT solutions for mapping between private IP addresses and public IP addresses.

Figure 4:
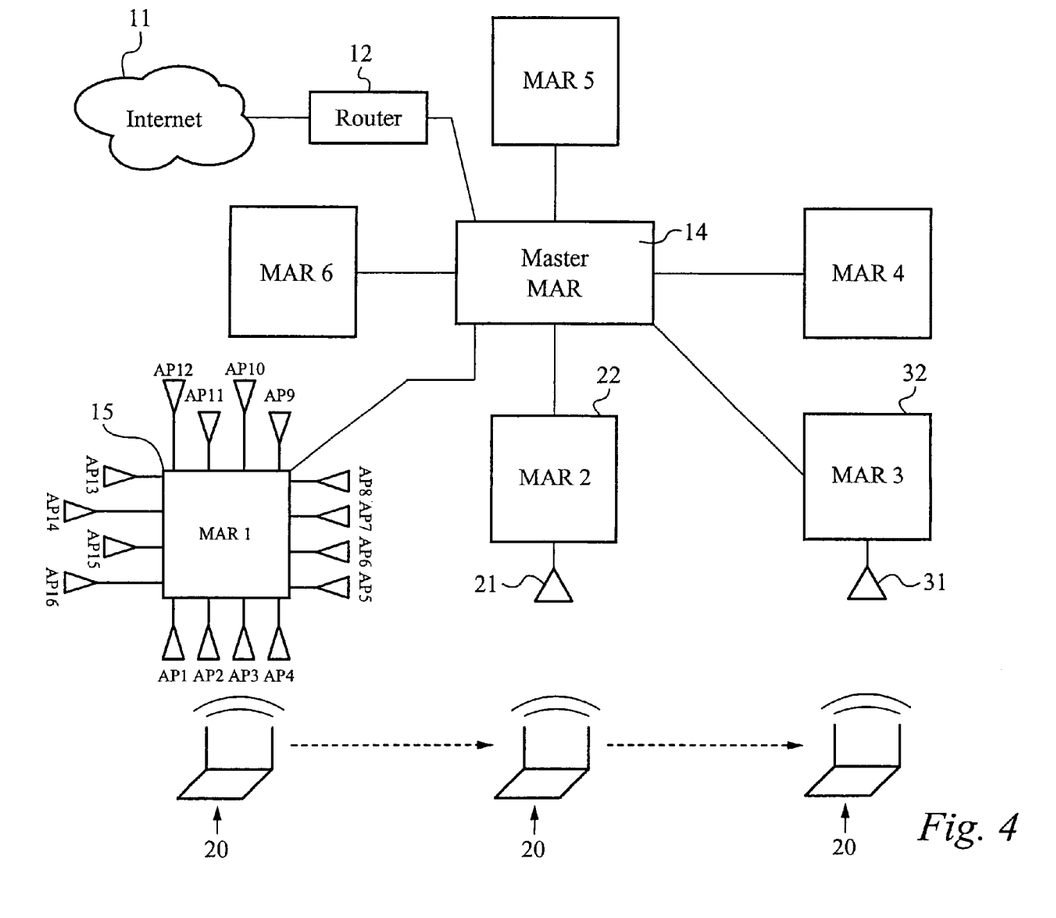
FIG. 4 is a schematic diagram illustrating a system in which the present invention may be implemented and particularly a subnet that connects to a master subnet and manages up to 16 access points to provide roaming for a mobile device.

FIG. 4 is a schematic diagram illustrating a system in which the present invention can be implemented. As shown in this figure, each subnet couples to a master subnet and manages 16 access points to provide roaming for a mobile device. A subnet can manage up to sixteen wireless access points to provide roaming and throughput controls. Each access point preferably supports up to 40 concurrent users. Therefore, a subnet can preferably connect up to 640 concurrent users.

As an example, the mobile device 20 can roam from its home subnet 15 to a first remote subnet 22 as well as a second remote subnet 32. In a wireless network, access points 21 and 31 are coupled to the remote subnets 22 and 32. As mentioned above, the access points 21 and 31 can have an antenna and receiver for receiving packets. As soon as the mobile device 20 connects to the Internet 11 through its home subnet 15, the home subnet 15 will forward the IP address of the mobile device 20, MAC address, and current location information (e.g., AP1 and MAR 1), to each neighboring subnet (e.g., remote subnets 22 (MAR 2) and 32 (MAR 3)). The neighboring subnets 22 and 32 update their intelligence tables to reflect the registration of the mobile device 20. The mobile device 20 maintains a permanent IP address throughout the network once it registers with its home subnet. When the mobile device 20 roams to the remote subnet 22, the home subnet's 15 and the first remote subnet's 22 intelligence tables are updated to indicate that the mobile device 20 has roamed to the first remote subnet 22. The current location entry for the mobile device 20 in home subnet's 15 intelligence table is changed from "inbound" to "outbound". The current location entry for the mobile device 20 in the first remote subnet's 22 intelligence table is changed from "outboundg" to "inbound". Furthermore, the first remote subnet 22 forwards mobile device's IP address, MAC address, and current location information (e.g., 21 and MAR 2) to a second remote subnet 32. The second remote subnet 32 updates its intelligence tables to reflect the movement of the mobile device 20. When the mobile device 20 roams to the second remote subnet 32, the first remote subnet's 22 and the second remote subnet's 32 intelligence tables are updated to indicate that the mobile device 20 has roamed to the second remote subnet 32. The current location entry for the mobile device 20 in first remote subnet's 22 intelligence table is changed from "inbound" to "outbound". The current location entry for the mobile device 20 in second remote subnet's 32 intelligence table is changed from "outbound" to "inbound". Furthermore, the second remote subnet 32 forwards mobile device's IP address, MAC address, and current location information (e.g., 31) to third remote subnet and so forth, until the mobile device logs off or roams outside the network. It is important to note that, no matter where the mobile device's 20 current location, the remote subnets 22 and 32 do communicate with the master subnet 14 or the IP router 12. All incoming packets are directed first to the home subnet 15 before being forwarded to a remote subnet. Likewise, all outgoing packets sent by the mobile device 20 are first forwarded to the home subnet 15 prior to receipt by the master subnet 14 or the IP router 12. In this way, the data for each mobile device is only maintained in the intelligence tables of the subnet where the mobile device is resident as well as the neighboring subnets rather than the entire wireless network. This saves a substantial amount of memory.

Figure 5:
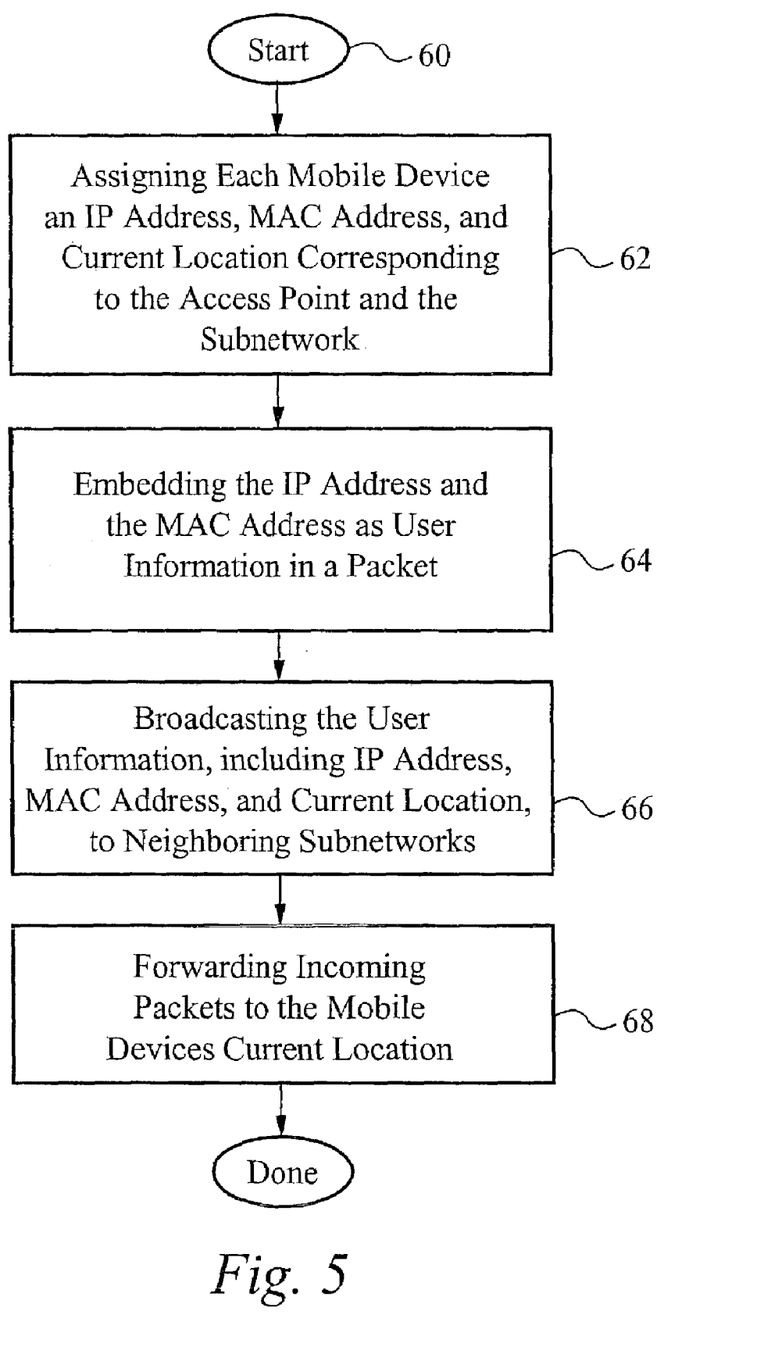
FIG. 5 is a flow chart showing how subnets of this invention may handle roaming from a visiting mobile device within the network.

FIG. 5 is a flow chart showing how subnets of this invention handle roaming from a visiting mobile device within the network. As shown, the method begins at step 60, and at step 62, the subnet assigns each mobile device an IP address, MAC address, and current location corresponding to an access point and subnet. At step 64, the subnet embeds the IP address and the MAC address as user information in a packet. The subnets then broadcasts the user information, which includes the IP address, the MAC address and the current location, to neighboring subnets at step 66. Next, the subnet forwards incoming packets to the mobile device's current location at step 68. The current location could be a remote subnet. If so, then the remote subnet forwards the packet(s) to the mobile device via an access point and subnet.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modification may be made in the embodiments chosen for illustration without departing from the spirit and scope of the invention.

What is claimed is:

1. A mobile wireless network, comprising:
a plurality of subnetworks, at least one subnetwork coupled to a network router, each subnetwork including at least one access point, wherein each neighboring subnetwork shares user information, including an internet protocol (IP) address for each mobile device in the subnetwork and media access control (MAC) address, with a plurality of neighboring subnetworks to allow a mobile device to remain coupled to the wireless network.

2. The mobile wireless network of claim 1, wherein the subnetworks are mobile access routers.

3. The mobile wireless network of claim 2, wherein the mobile access routers comprise a plurality of subnetwork tables for tracking the mobile devices located in each of its access points and in neighboring access routers.

4. The mobile wireless network of claim 3, wherein the subnetwork tables are updated when the mobile devices move from one subnet to another.

5. The mobile wireless network of claim 3, wherein the subnetwork tables comprise the mobile device's Internet Protocol (IP) address, media access control (MAC) address, and current location corresponding to the access point and the subnetwork.

6. The mobile wireless network of claim 1, wherein the access point is a radio antennae.

7. The mobile wireless network of claim 5, wherein the current location is either an inbound or outbound location.

8. A method of allowing a mobile device to remain coupled to a mobile wireless network, wherein the mobile device accesses the wireless network through an access point, and the access point is coupled to a subnetwork, the wireless network comprising a plurality of subnetworks, the method comprising: assigning each mobile device an Internet Protocol (IP) address, media access control (MAC) address, and current location corresponding to the access point and the subnetwork; embedding the IP address and the MAC address as user information in a packet; broadcasting the user information to a plurality of neighboring subnetworks; and forwarding incoming packets to the mobile device's current location.

9. The method of claim 8, wherein the user information includes the IP address, the MAC address, and the current location.

10. The method of claim 8, wherein the subnetworks are mobile access routers.

11. The method of claim 10, wherein the mobile access routers comprise a plurality of subnetwork tables for tracking the mobile devices located in neighboring mobile access routers.

12. The method of claim 11, wherein the subnetwork tables are updated when the mobile devices move from one subnetwork to another.

13. The method of claim 11, wherein the subnetwork tables comprise the mobile device's Internet Protocol (IP) address, media access control (MAC) address, and current location corresponding to the access point and the subnetwork.

14. The method of claim 8, wherein the access point is a radio antennae.

15. The method of claim 13, wherein the current location is either an inbound or outbound location.

16. The method of claim 15, wherein the inbound or outbound location corresponds to an access point and subnetwork.

17. A mobile wireless network, comprising:
a plurality of subnetworks arranged in an array of subnetworks, such that each of the subnetworks has a plurality of neighboring subnetworks and a plurality of non-neighboring subnetworks, at least one subnetwork coupled to a network router, each subnetwork including at least one access point, wherein each neighboring subnetwork shares user information, including an internet protocol (IP) address for each mobile device in the sub network and media access control (MAC) address, with a plurality of neighboring subnetworks to allow a mobile device to remain coupled to the wireless network.

18. The mobile wireless network of claim 17, wherein the subnetworks are mobile access routers.

19. The mobile wireless network of claim 18, wherein the mobile access routers comprise a plurality of subnetwork tables for tracking the mobile devices located in neighboring mobile access routers.

20. The mobile wireless network of claim 19, wherein the subnetwork tables are updated when the mobile devices move from one subnet to another.

21. The mobile wireless network of claim 19, wherein the subnetwork tables comprise the mobile device's Internet Protocol (IP) address, media access control (MAC) address, and current location corresponding to the access point and the subnetwork.

22. The mobile wireless network of claim 17, wherein the access point is a radio antennae.

23. The mobile wireless network of claim 21, wherein the current location is either an inbound or outbound location.

24. The mobile wireless network of claim 23, wherein the inbound or outbound location corresponds to an access point and subnetwork.

25. A mobile wireless network, comprising:
a plurality of subnetworks coupled to master subnetwork, the master subnetwork coupled to a network router, each subnetwork including at least one access point, wherein each neighboring subnetwork shares user information, including an internet protocol (IP) address for each mobile device in the subnetwork and media access control (MAC) address, with a plurality of neighboring subnetworks to allow a mobile device to remain coupled to the wireless network.

26. The mobile wireless network of claim 25, wherein the subnetworks are mobile access routers.

27. The mobile wireless network of claim 26, wherein the mobile access routers comprise a plurality of subnetwork tables for tracking the mobile devices located in neighboring mobile access routers.

28. The mobile wireless network of claim 27, wherein the subnetwork tables are updated when the mobile devices move from one subnet to another.

29. The mobile wireless network of claim 27, wherein the subnetwork tables comprise the mobile device's Internet Protocol (IP) address, media access control (MAC) address, and current location corresponding to the access point and the subnetwork.

30. The mobile wireless network of claim 25, wherein the access point is a radio antennae.

31. The mobile wireless network of claim 29, wherein the current location is either an inbound or outbound location.

32. The mobile wireless network of claim 31, wherein the inbound or outbound location corresponds to an access point and subnetwork.

33. The mobile wireless network of claim 25, wherein the master subnetwork comprises a master subnetwork table for tracking all mobile devices among the subnetworks.

34. The mobile wireless network of claim 33, wherein the master subnetwork table is updated when the mobile devices move from one subnet to another.

35. The mobile wireless network of claim 33, wherein the master subnetwork table comprises Internet Protocol (IP) addresses, media access control (MAC) addresses, and current location information of all mobile devices among the subnetworks.

36. The mobile wireless network of claim 35, wherein the current location is either an inbound or outbound location.

37. The mobile wireless network of claim 36, wherein the inbound or outbound location corresponds to an access point and subnetwork.

38. A mobile wireless network, comprising:
a plurality of subnetworks, at least one subnetwork coupled to a network router, each subnetwork including at least one access point, wherein each neighboring subnetwork shares user information, including an internet protocol (IP) address for each mobile device in the subnetwork and media access control (MAC) address, with a plurality of neighboring subnetworks to allow a mobile device to remain coupled to the wireless network at any location within the wireless network without obtaining a new IP address when roaming among the neighboring subnetworks.

39. The mobile wireless network of claim 38, wherein the subnetworks are mobile access routers.

40. The mobile wireless network of claim 39, wherein the mobile access routers comprise a plurality of subnetwork tables for tracking the mobile devices located in its access point(s) and in neighboring mobile access routers.

41. The mobile wireless network of claim 40, wherein the subnetwork tables are updated when the mobile devices move from one subnet to another.

42. The mobile wireless network of claim 40, wherein the subnetwork tables comprise the mobile device's Internet Protocol (IP) address, media access control (MAC) address, and current location corresponding to the access point and the subnetwork.

43. The mobile wireless network of claim 38, wherein the access point is a radio antennae.

44. The mobile wireless network of claim 42, wherein the current location is either an inbound or outbound location.

45. The mobile wireless network of claim 44, wherein the inbound or outbound location corresponds to an access point and subnetwork.

* * * * *

UNITED STATES PATENT AND TRADEMARK OFFICE
CERTIFICATE OF CORRECTION

PATENT NO. : 7,016,682 B2
APPLICATION NO. : 10/377949
DATED : March 21, 2006
INVENTOR(S) : Chan Yeon Won, Seong Young Park and Ki B. Kang It is certified that error appears in the above-identified patent and that said Letters Patent is hereby corrected as shown below:

Title page, under Refer. Cited item [56] FOREIGN PATENT DOCUMENTS - p. 1

Add --EP 1 047 225 A2  10/2000--

Add --GB 2 387 296 A  10/2003--

IN THE REFERENCES CITED - OTHER PUBLICATIONS -

Add –Mahadevan, I. et al., "An Architecture for QoS guarantees and Routing in Wireless/Mobile Networks", Copyright ACM, 1998, pages 11-20–

Add –C. Perkins et al., "OP Mobility Support", IBM, October 1998, pages 1-79–

Signed and Sealed this

Fifth Day of September, 2006

JON W. DUDAS
*Director of the United States Patent and Trademark Office*